United States Patent [19]

Fisher

[11] Patent Number: 4,900,965
[45] Date of Patent: Feb. 13, 1990

[54] LIGHTWEIGHT HIGH POWER ELECTROMOTIVE DEVICE

[75] Inventor: Gene A. Fisher, Highlands Ranch, Colo.

[73] Assignee: Fisher Technology, Inc., Littleton, Colo.

[21] Appl. No.: 250,263

[22] Filed: Sep. 28, 1988

[51] Int. Cl.[4] ............ H02K 1/16; H02K 21/22; H01F 7/08

[52] U.S. Cl. ............... 310/216; 310/12; 310/67 R; 310/256; 310/266

[58] Field of Search ............ 310/45, 156, 67 R, 216, 310/218, 261, 265, 266, 12, 256

[56] References Cited

U.S. PATENT DOCUMENTS

| | | |
|---|---|---|
| 295,368 | 3/1884 | Dennis . |
| 464,026 | 12/1891 | Kammeyer . |
| 497,001 | 5/1893 | Crompton . |
| 1,227,185 | 5/1917 | Neuland . |
| 2,792,511 | 5/1957 | Horstman ............ 310/218 |
| 3,014,139 | 12/1961 | Shildneck ............ 310/64 |
| 3,082,337 | 3/1963 | Horsley ............ 310/179 |
| 3,102,964 | 9/1963 | Bennett et al. . |
| 3,128,402 | 4/1964 | Amick, Jr. . |
| 3,134,037 | 5/1964 | Upton ............ 310/90 |
| 3,275,863 | 9/1966 | Fodor ............ 310/166 |
| 3,312,846 | 4/1967 | Henry-Baudot . |
| 3,322,986 | 5/1967 | Benatti et al. ............ 310/261 |
| 3,538,364 | 11/1970 | Favereau . |
| 3,602,749 | 8/1971 | Esters ............ 310/154 |
| 3,659,129 | 4/1972 | Pettersen ............ 310/216 |
| 3,663,850 | 5/1972 | Phelon . |
| 3,729,642 | 4/1973 | Esters . |
| 3,845,338 | 10/1974 | Fawzy ............ 310/154 |
| 3,858,071 | 12/1974 | Griffing et al. . |
| 4,114,057 | 9/1978 | Esters . |
| 4,128,364 | 12/1978 | Papst et al. . |
| 4,149,309 | 4/1979 | Mitsui ............ 310/218 |
| 4,316,111 | 2/1982 | Merkl et al. ............ 310/218 |
| 4,321,494 | 3/1982 | MacNab ............ 310/179 |
| 4,398,167 | 8/1983 | Dickie et al. ............ 310/266 |
| 4,451,749 | 5/1984 | Kanayama et al. ............ 310/62 |
| 4,501,980 | 2/1985 | Welburn ............ 310/266 |
| 4,517,484 | 5/1985 | Dacier . |
| 4,731,554 | 3/1988 | Hall et al. ............ 310/266 |
| 4,734,606 | 3/1988 | Hajec ............ 310/67 R |

Primary Examiner—Patrick R. Salce
Assistant Examiner—D. L. Rebsch
Attorney, Agent, or Firm—Harold Gell

[57] ABSTRACT

A lightweight electromotive device with a high power-to-weight ratio capable of operating as an efficient motor, alternator or generator includes an mangetic-flux producing assembly comprising spaced magnetic elements, and an armature assembly formed by winding conductive, non-magnetic wire, such as copper wire on flux carrying core or stator bar elements. The elements are shaped to form an eddy current shield for the windings and provide two heat radiating surfaces. This allows the device to operate with minimal eddy current losses and maximum radiation and convection cooling. The armature windings and flux carrying elements are dispersed as a further measure to avoid creating opposing induced currents.

39 Claims, 4 Drawing Sheets

LIGHTWEIGHT HIGH POWER ELECTROMOTIVE DEVICE

FIELD OF THE INVENTION

This invention relates to high power-to-weight electromotive device capable of use as a motor, alternator or generator.

BACKGROUND OF THE INVENTION

Electromotive devices are known for use both in transforming electrical energy into mechanical power and transforming mechanical power into electrical energy. In both cases, the energy or power-producing capability results due to relative movement between a magnetic field and electrically conductive elements.

Light weight motor, alternator and generator devices are well known and some are capable of operation at high speeds. However, many such devices are not capable of producing high power at high speeds. For example, high power density devices of 0.6 horsepower per pound of weight are known for intermittent operation, but such devices are incapable of continuous operation at high power densities in excess of 1.0 horsepower per pound.

Prior electromotive devices have not been capable of simultaneous high speed and high torque operations, nor have they provided efficiency of operation.

Known electromotive devices which include a stator and rotor arrangement can include magnetic elements on the rotor (for example, see U.S. Pat. Nos. 3,663,850; 3,858,071; or 4,451,749) or on the stator (U.S. Pat. Nos. 3,102,964; 3,312,846; 3,602,749; 3,729,642 or 4,114,057). Further more, double sets of polar pieces can be utilized, as in U.S. Pat. No. 4,517,484.

In addition, a shell rotor has been suggested in U.S. Pat. Nos. 295,368; 3,845,338 and 4,398,167, with a double shell rotor arrangement suggested in U.S. Pat. No. 3,134,037.

Bundles of wires have been used in place of a single conductor in the armature assemblies of motors for high voltage and high current usage and/or to reduce current flow loss due to skin effect, and heating due to eddy currents, see U.S. Pat. Nos. 497,001; 1,227,185; 3,014,139; 3,128,402; 3,538,364 or 4,321,494, or British Patent No. 9,557. The plural wires are used with solid or laminated cores, see U.S. Pat. No. 3,014,139 or 3,128,402; or British Patent No. 9,557.

Some prior electromotive deVices, such as U.S. Pat. No. 3,275,863, have a power-to-weight ratio of up to one horsepower per pound and U.S. Pat. No. 4,128,364 teaches using a gas, liquid, or a mixture thereof to cool a motor to increase its power handling capability.

Many of the preceding difficulties in achieving a high power-to-weight ratio electromotive device have been addressed by a dispersed conductor electromagnetic device which is the subject of a co-pending U.S. patent application by the inventor of the present invention titled "Lightweight High Power Electromagnetic Transducer". The co-pending design utilizes a straight-sided armature bar of powdered iron which allows full exposure of the copper to the magnetic field. In addition, the powdered iron does not have the flux-carrying ability that the silicon iron does. To minimize the eddy current effect, it utilizes extremely fine wire.. The armature bars are fabricated from powdered iron to further insure the 3-d dispersion necessary to reduce/minimize back electro-motive-force (back EMF).

Unfortunately, this approach is inefficient in terms of power-in versus power-out due to the resistance characteristic of fine wire. This characteristic causes significant energy loss in the form of heat at higher operating levels, which translates into lost power and efficiency. In addition, the straight bars do not lend themselves to standard production automatic winding techniques as the coils would slip outward from between the bars.

The power loss due to fine wire resistance is compensated for by increasing the amount of permanent magnet material beyond the saturation level of the iron bars. Aside from the costs of additional material, the bulk of this additional flux goes into the copper in the form of eddy current loss and is dispersed, leaving very little gain in power for the additional material investment. While the preceding and other various arrangements have been used to attempt to achieve a high power-to-weight ratio electromotive device, they have not been completely successful. In particular, the prior art does not teach the necessity to disperse the conductors to enable high speed operation. This is due, at least in part, to a widely accepted theory that the magnetic field is relatively small in the non-magnetic winding conductors. With conductors built according to conventional teachings, it has been found that torque, at constant current, decreases with increasing speed. This result is contrary to the conventional expectation that torque will remain high as speed increases.

OBJECTIVES OF THE INVENTION

It is a primary objective of this invention to provide an electromotive device which achieves a high power-to-weight ratio by dispersing the electromotive windings to minimize eddy currents within the coils.

It is a further objective of this invention to provide an electromotive device which achieves a high power-to-weight ratio by dispersing the electromagnetic field core pieces to minimize eddy currents.

It is a still further objective of this invention to provide an electromotive device which achieves a high power-to-weight ratio by dispersing the electromotive windings to minimize eddy currents within the coils the electromagnetic field core pieces to minimize eddy currents generally.

It is another objective of this invention to provide an electromotive device which achieves a high power-to-weight ratio by shielding the electromotive windings with field core piece extensions to minimize eddy currents within the coils.

It is a primary object of this invention to provide an improved electromotive device.

It is another object of this invention to provide an improved electromotive device that is lightweight and provides high power.

It is still another object of this invention to provide an improved electromotive device that operates at high efficiency.

It is still another object of this invention to provide an improved electromotive device having high power density per unit weight.

It is still another object of this invention to provide an improved electromotive device having a high power-to-weight ratio.

It is still another object of this invention to provide an improved electromotive device capable of use as a highly efficient motor, alternator or generator.

It is still another object of this invention to provide an improved electromotive device that is capable of continuous operation at high power densities in excess of one horsepower per pound.

It is still another object of this invention to provide an improved electromotive device having an armature assembly with dispersed conductors, different sections of which have flux carrying elements positioned therebetween with the conductors and flux carrying elements being formed and positioned in a manner so as to create low opposing induced currents.

It is still another object of this invention to provide an improved electromotive device having an optimum thickness armature assembly which represents a balance among the effects of heat transfer to the cooling medium, heat production from resistance heating and other sources, and torque production.

The foregoing and other objectives will become apparent to one skilled in the art as the description proceeds. This invention resides in the novel construction, combination, and arrangement of parts substantially as described and illustrated in the specification and drawings of this patent, and more particularly defined by the appended claims, it being understood that changes in the precise embodiments of the herein disclosed invention are meant to be included as within the scope of the claims.

SUMMARY OF THE INVENTION

This invention provides an improved electromotive device with a high power density per unit weight effected by utilization of an armature assembly having a large diameter-thin cross section speculation ratio. This results in low opposing induced currents, as well as low eddy currents, to enable operation of the electromotive device at high efficiency with high torque being maintainable during high speed operation.

When the armature moves relative to a magnetic flux producing assembly, eddy currents are established in the electrically conductive portions of the armature and these currents lead to heating and skin effects (collectively known as eddy current losses). However, these currents also produce another effect not recognized by the prior art. They are opposing induced currents which alter the magnetic flux pattern and act to reduce the torque with speed increase. This power conversion reduction with speed increase is minimized in this invention by dispersing the conductors forming the windings.

BRIEF DESCRIPTION OF THE DRAWINGS

The accompanying drawings illustrate complete embodiments of the invention according to the best mode so far devised for the practical application of the principles of this invention in which:

FIG. 2 is a sectional view taken through lines 2—2 of FIG. 1.

FIG. 3 is a partial isometric view of an armature showing the arrangement of the dispersed conductors and flux carrying elements of the electromotive device shown in FIGS. 1 and 2.

FIG. 4 is a diagram illustrating a typical arrangement of a two layer winding formed by the dispersed conductors and illustrating the flux carrying elements positioned between turns of the windings.

FIG. 13 is a graph illustrating the relationship between torque and speed for a conventional electromotive device b and for the electromotive device of this invention a.

FIG. 14 is a graph illustrating tested eddy current, hysteresis and windage losses at different speeds of one example of the electromotive device of this invention.

DESCRIPTION OF THE INVENTION

This invention provides a high power density (1 to 5 horsepower per pound) electromotive device incorporating a large diameter-thin cross section speculation ratio. This is advantageous because for a given number of magnets or poles . . . the larger the diameter, the larger (circumferences) each can be. As diameter decreases, the circumferential size of each magnet decreases until it is virtually not seen or interacted with. Conversely, given a fixed size magnetic pole, as diameter increases more magnetic poles can be utilized resulting in working the copper-iron-magnets more times per revolution (producing more power). Therefore within limits, a reduction in diameter induces loss of power and efficiency per unit mass. In addition, through basic physics, torque is directly proportional to the effective radius of the acting force ($T = R \times F$). Actually as you double the radius, you double the torque arm and double the amount of material producing torque, so power and torque go up as the square of the radius.

In a typical electric motor, torque falls off rapidly with increasing speed. This is primarily due to "opposing induced currents" or "eddy current losses" in the copper conductors and armature bars. The losses associated with the windings or copper are caused by; cross-leakage between bars (made worse by radially long bars), direct exposure of the copper to the magnetic field, and over saturation of the armature bars due to an excess amount of permanent magnet material. These losses are minimized by this invention.

Losses associated with bar-to-bar cross leakage are reduced by designing the electromotive device of this invention so that it incorporates radially short armature bars.

Losses induced by the copper being directly exposed to the magnetic field is solved by the present invention by an I-shaped armature bar acting as a shield to the magnetic field.

Finally, losses caused by over saturation of the armature bars is solved by reducing the amount of permanent magnet material such that the bars just "approach" saturation. This is accomplished empirically as explained later.

These three factors allow for much heavier wire to be utilized without fear of eddy current losses (cross-sectional area of wire approximately eight times that of prior designs). The heavier gage wire provides two significant functions; it significantly reduces resistance heating due to its cross-sectional area increase and it allows more conductor (copper) per available space. These two functions enable increased efficiency and increased power output respectively. In addition, the armature bars themselves are constructed as a lamination of several individual thin stampings, each insulated one from the other. The insulation is a silicon oxide by product produced during the annealing process. Because sheet metal stampings are utilized, the material grain direction can be and is controlled in the radial direction thereby insuring a maximum flux carrying capability (see FIG. 6).

The controllable dispersion characteristics achieved via thin lamination grain control provides much better performance than the powdered iron 3-d dispersion solid bars in the co-pending application previously referenced. The I-shaped lamination assembly (armature bar) lends itself to conventional automatic winding techniques when a special holding fixture is utilized.

The losses associated with the windings or copper caused by over-saturation of inductor bars due to an excess of permanent magnet material is addressed in the present invention by designing the proper amount of permanent magnet material to "approach" the saturation level of the armature bars. This is accomplished by empirical methodology to optimize the combination of copper, iron, and permanent magnet materials to achieve optimum power density and optimum efficiency through "saturation approaching". Saturation or over-saturation is not necessary and is a serious detriment to good performance. In the empirical method, a very sensitive dynamometer is used to measure and plot losses as a function of field. When copper eddy currents were gone, the flux was not reduced anymore. Based on the developed data, the flux conducting bars are fabricated from a metal alloy having an iron content which creates a flux carrying ability approximately equal to the flux saturation point as determined by the electrical properties of the design.

The preferred embodiments of the invention use a hollow cross-sectional arrangement which lends itself to multiple concentric elements or multiple-motors-within-a-motor. These could be operated concurrently to maximize power density per available space, or individually in a staged manner (like shifting gears in a transmission).

The cross-sectional arrangement features two radiating and convecting surfaces for rejecting heat from the armature (conventional designs have one). Thus the motor can be driven at higher power levels for longer durations without overheating.

The invention can be used as brush-commutated motor or brushless, both in radial and linear configurations. It can be used as a dc generator or an ac alternator. The ultimate use depending on whether an electrical signal is conveyed to the armature to create a force, causing movement of the magnetic flux producing structure relative to the armature, or whether the magnetic flux producing structure is moved relative to the armature.

Figure 1:
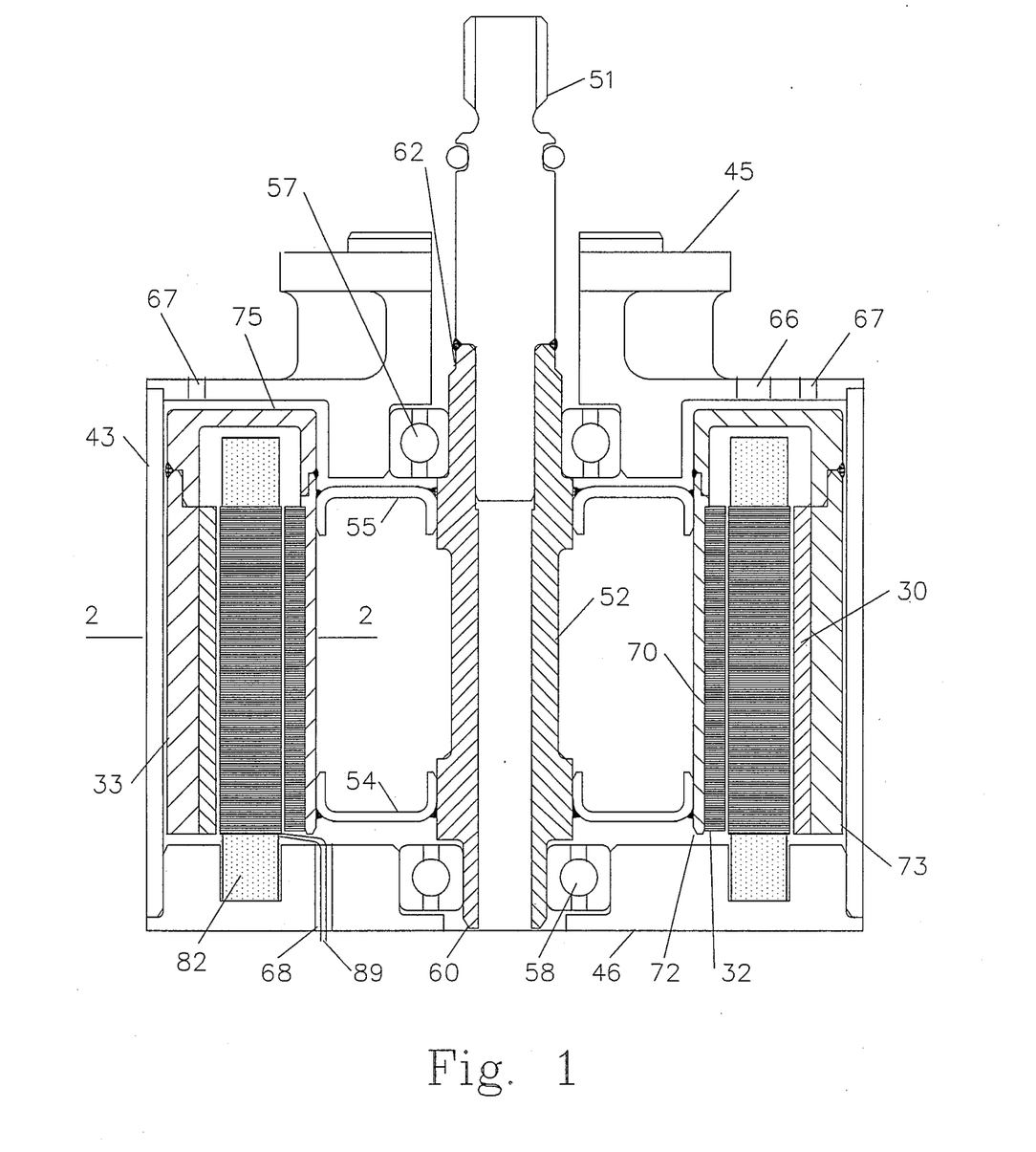
FIG. 1 is a side sectional view of a rotary implementation of the electromotive device of this invention.

An exemplary embodiment of the electromotive device is illustrated in FIG. 1. This embodiment includes an outer cylindrical housing 43 which is completed by front 45 and rear end plates 46 secured at opposite ends of the cylindrical housing.

A shaft 51 includes a central portion 52 extending through the cylindrical housing. The shaft is mounted in the end plates 45 and 46, respectively, by means of bearings 57 and 58 so that the central portion of the shaft is coaxially positioned with respect to the cylindrical housing. The reduced diameter rear portion 60 of the shaft is mounted in bearing 58 and the front portion 62 of the shaft extends through the front bearing 57 and end plate 45.

The end plates, 45 and/or 46 may include air intake and exhaust apertures 66 and 67. These apertures allow cooling air to flow through the housing. In addition, an aperture 68 is positioned to allow armature conductor connections through end plate 46. In some environments, the device cannot operate in a gas (air) medium, so liquid coolant, such as oil, is used. In such cases, the housing is sealed to retain the liquid.

The rotor 70 has a double shell configuration provided by inner and outer spaced cylinders 72 and 73 which extend normally from the ring connection portion 75. The inner cylinder 72 is secured to the shaft center section 62 by a pair of hubs 54 and 55 to hold the double shell coaxially inside the cylindrical housing 43.

Figures 2, 3, 4, 13, 14:
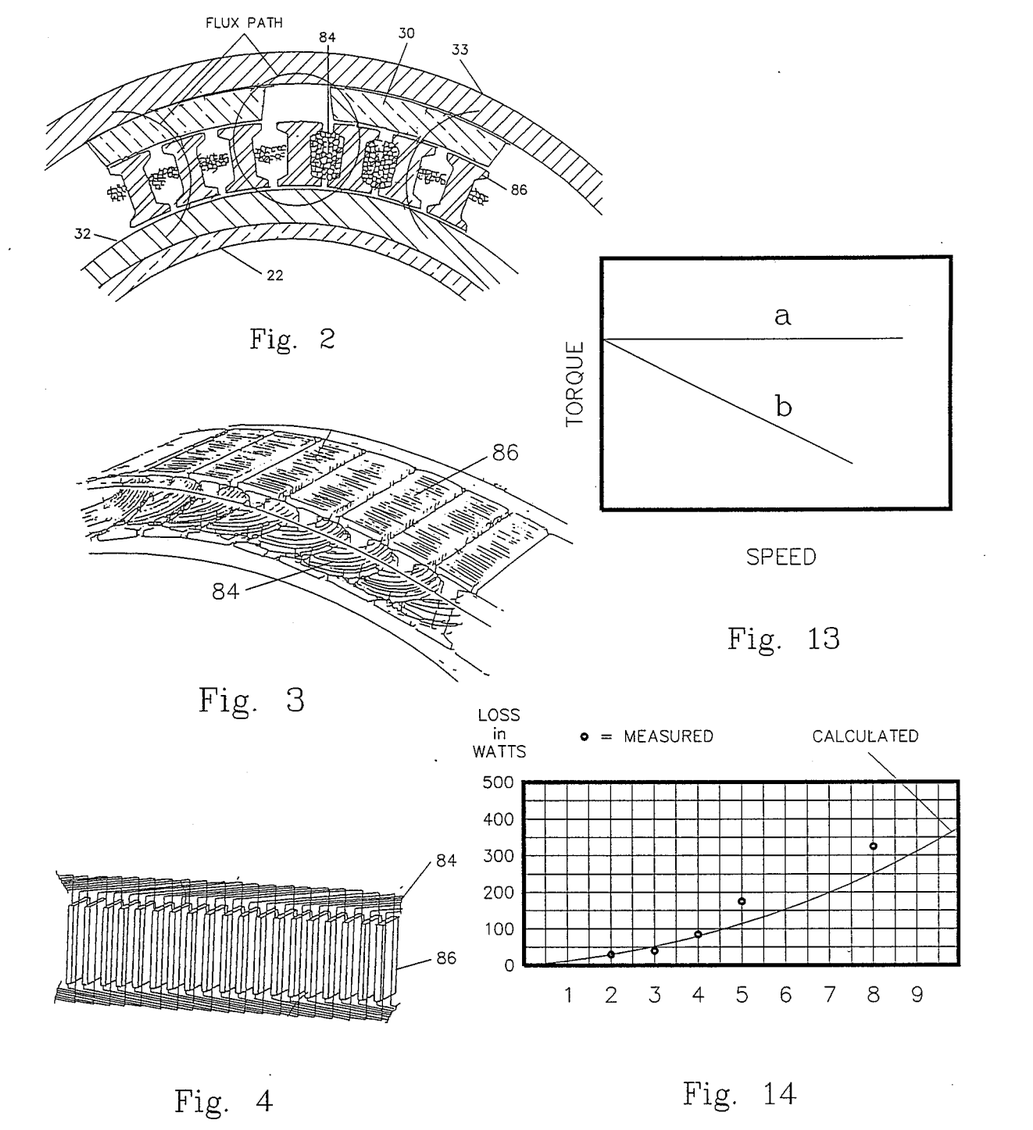

FIG. 2 is a portion of a cross-sectional view taken along lines 2—2 of FIG. 1. It more clearly illustrates that the inner cylinder 72 of rotor 70 includes a magnetic flux return path in the form of a shell, 32, which is preferably a lamination of rings of silicon iron or some other magnetically permeable, low hysteresis loss magnetic material supported by the cylindrical section 72 extending from the hubs 54 and 55. The cylinders 72 and 73 and connecting ring 75 are formed of any suitable material, including iron.

The outer cylinder 73 comprises a magnetic flux return path, 33, which may be solid iron or some other permeable, low hysteresis loss magnetic material and a plurality of magnetic field generator, such as magnets 30, are mounted on the inner surface of return path 33. In the exemplary embodiment, the magnets 30 are permanent magnets preferably formed of neodymium boron ferrite (NdFeB), but they may be formed of barium ferrite ceramic (BaFe Ceramic), samarium cobalt (SmCo), or the like. Permanent magnets are used in the illustrated exemplary embodiment but they could be replaced with electromagnets.

Returning to FIG. 1, the stator inductor 82 is fixed with respect to housing 43. It is mounted on the rear end plate 46 so that the rotor 70 rotates around the common axis of the stator 82 and the housing 43. The stator 82 is a stationary cylindrical shell encompassed by the inner and outer cylinders 72 and 73 of the rotor.

The stator 82 includes electrical conductors 84 of FIGS. 2 and 3 which are randomly dispersed between stator bars 86. Dispersed conductors 84 are preferably a bundle of relatively large (for an electromotive device) diameter insulated copper wires wound into a linking pattern, with the opposite ends of the wire bundles connected to connectors 89 which extend through aperture 68 in end plate 46 of FIG. 1. The use of dispersed, large diameter windings enables the resultant electromotive device to achieve a high power-to-weight ratio because (1) the dispersed windings minimize eddy currents within the coils and (2) the large diameter wire reduces the number of field generating elements for a given power factor which also reduces eddy currents within the coils.

Conductors 84 are formed into a bundle throughout the armature, with each turn of the wire windings having a flux carrying element or stator bar 86 therebetween. A typical winding is schematically illustrated in FIG. 4.

Figures 5, 6, 7:
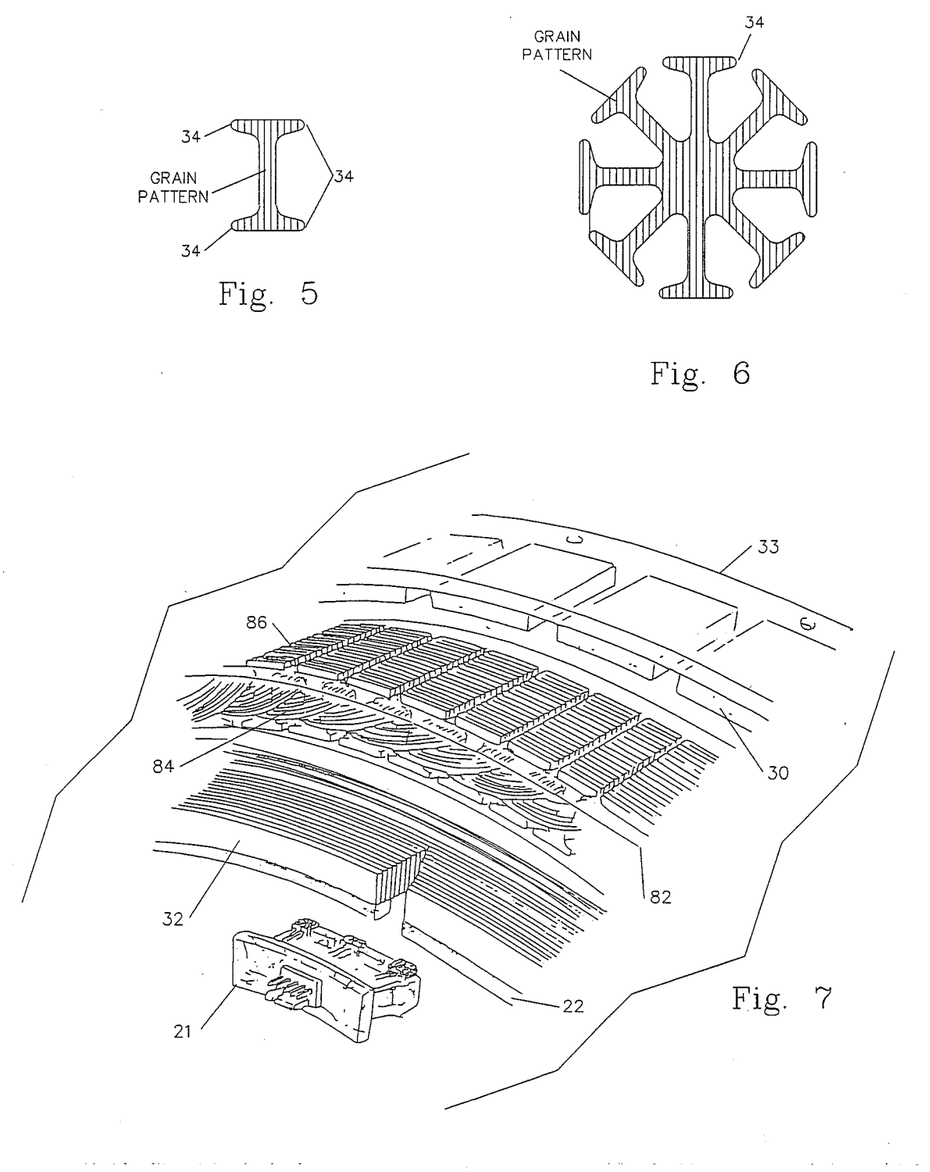
FIG. 5 is a single lamination stamping of controlled grain ferrous metal which, when laminated in mass, form "I" beam stator bars.
FIG. 6 is a single lamination stamping of controlled grain ferrous metal which, when laminated in mass, form a plurality of modified "I" stator bars.
FIG. 7 is a partial isometric view of an armature showing the arrangement of the dispersed conductors and flux carrying elements of the electromotive device shown in FIG. 1.

The flux carrying elements, stator bars 86, are preferably a lamination of a plurality of silicon iron sheets. FIG. 5 illustrates the configuration of a single layer or sheet of a laminated stator bar. The extensions 34 at the four corners give the bar an "I" beam cross sectional configuration and provide increased surface area for cooling, as well as flux shielding for the windings. These two advantages over the prior art are further features which enable the resultant electromotive device to achieve a high power-to-weight ratio. Shielding the electromotive windings from the magnetic fields within the motor minimizes eddy currents within the coils. This and the increased cooling heat exchange surface allows higher current flow which increases field strength without increasing eddy currents in the windings.

The use of stampings such as illustrated in FIG. 5 allow the grain direction within the metal forming the bar to be controlled. Thus a bar may be produced with a grain direction as illustrated in FIG. 5 wherein the grain direction is parallel to the primary flux path through the stator bar. This reduces heat generation because of the reduced level of resistance to magnetic flux. A random grain pattern provides maximum resistance which leads to maximum heat generation and a uniform grain pattern reduces resistance and its resultant heat. A grain pattern following the direction of flux minimizes resistance and heating. Thus a controlled grain inductor bar construction allows higher flux densities without increased heating. This increases the efficiency of the device and aids in reaching the stated objectives of the invention.

FIG. 6 illustrates an alternate shape for each layer of the laminated induction core or stator bar. In this embodiment, all of the bars share a common central section which simplifies stamping, laminating and assembly.

When used as a motor at constant current, the torque output of this invention can be maintained nearly constant even with increases in rotor speed, as illustrated in FIG. 13 by line a. This is unlike prior art devices wherein torque drops off rapidly with increased speed, as indicated in FIG. 13 by line b. The combination of high torque and high speed, made possible in the electromotive device of this invention, results in a high power-to-weight ratio.

The stator 82 (formed by the dispersed conductors 84 and flux carrying members 86) is closely spaced with respect to magnets 80 positioned about the inner surface of the cylindrical flux return path 33, and also closely spaced with respect to the laminated cylindrical flux return path 32, see FIGS. 2 and 7. As previously explained and illustrated, cylindrical sections 72 and 73 provide support for the inner and outer magnetic flux return paths. Typical flux paths have been illustrated in FIG. 2. As shown, these flux paths are loops, each of which penetrates the inductor or stator, twice passing through the flux carrying members 86. The flux carrying members are dimensioned to create a thick induction to maintain a high flux density which is essential to high torque. Thus, as illustrated in FIG. 7, the dimension of the flux conducting bars 82 along the axis parallel to the primary flux path through the bars is short relative to the longitudinal axis of the bars which parallels the major axis of the electric windings 84 disposed about the bars for generating an electromagnetic field.

Figures 8, 9, 10, 11, 12:
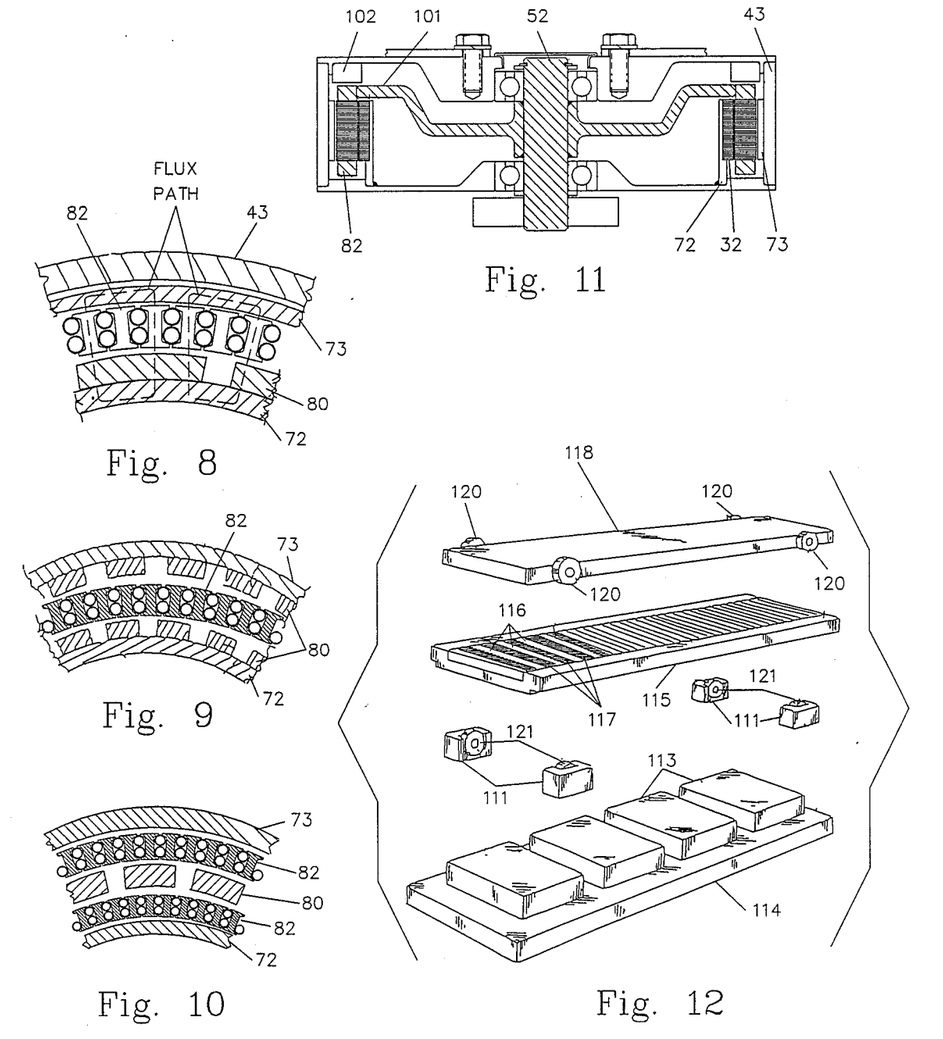
FIG. 8 is a partially cutaway view similar to that of FIG. 2 but illustrating an alternate embodiment of the electromotive device of this invention.
FIG. 9 is a partially cutaway view similar to that of FIG. 2 but illustrating another alternate embodiment of the electromotive device of this invention.
FIG. 10 is a partial cutaway view similar to that of FIG. 2 but illustrating still another alternate embodiment of the electromotive device of this invention.
FIG. 11 is a side sectional view of an alternate embodiment of the electromotive device as shown in FIG. 1, and illustrates the inductor fixed to the shaft as may be convenient to a brush commutated system.
FIG. 12 is an exploded isometric view of still another alternate embodiment of the electromotive device of this invention, and illustrates a flat linear implementation thereof.

As indicated in FIG. 8, the electromotive device may be configured with magnets 80 on the outer surface of the inner cylindrical section 72 rather than on the inner surface of the outer cylindrical section 73. In FIG. 9, the electromotive device is configured with the magnets 80 on both inner and outer sections 72 and 73.

In FIG. 10, two cylindrical stators 82 encompass both sides of the magnets 80. In addition, while not specifically shown, it is also to be realized that the electromotive device could be configured by placing additional layers of stator-rotor elements radially inwardly and/or outwardly of that shown in the figures.

The electromotive device of this invention thus includes a magnetic flux producing assembly (having at least one pair of poles which can be embodied by using permanent magnets or electromagnets), and an inductor assembly (which intercepts the magnetic flux produced by the magnetic flux producing assembly and has an alternating structure of conductive windings and flux carrying elements. A winding can be used as the principal component of the inductor with the winding consisting of bundles of separate dispersed conductors. The use of dispersed conductors of large diameter wire permit high speed rotation of the rotor when used in conjunction with winding flux shielding, flux carrying elements.

In the case of conductors of large cross section or conductive flux carrying elements of large cross section, as used at least in some prior known devices, as the frequency of the magnetic field reversal increases, the magnitude of the induced currents in the bars increases, and the induced currents react with the magnetic field to create a resisting torque which opposes the increase of rotational speed. Thus, known shell type devices are inherently limited to low speed by the reaction torque, and cannot be rotated at high speed and are therefore not suitable, for example, for use as traction motors in most practical applications. However, by shielding the windings from the generated magnetic flux and isolating the flux created within the windings, induced currents are limited and the forgoing impediments to high-speed/high-torque operation are eliminated.

When used as a motor, a means to displace (i.e., rotate) the magnetic field relative to the armature at high speed must be provided so that electric power can be converted into mechanical power in a manner similar to that used by known motors. This can be accomplished by connecting connectors 89 of the armature 82 in FIG. 1 to a current source.

When used as an alternator or generator, an actuator rotates shaft 51 which rotates rotor 70 to induce a voltage on conductors 84 and thereby generate an electrical current flow from conductors 84 to a load via connector 89.

While not specifically shown, it is to be understood that the inductor includes necessary electric commutation devices, including those devices wherein commutation is performed electronically (as in a brushless DC motor, for example), as well as those devices which employ rectifiers instead of commutation (as is often used in power generating applications). A hall device, 21 of FIG. 7, may be used in conjunction with a magnetic ring 22 to sense inductor bar or pole piece passing to produce the required timing data.

FIG. 11 illustrates an embodiment of the electromotive device of this invention in which the inductor 82 becomes an armature. It is connected to shaft 52 by mounting disk 101, and inner and outer cylinders 72 and 73 are fixed to the housing 43. In this embodiment, the inductor becomes the rotor with electric power being communicated to it by means of brushes or slip rings 102 (with brushes being utilized in the case of a DC machine, and slip rings beinq utilized in the case of an AC machine). The embodiment shown in FIG. 11 is preferred for some applications, particularly in the case of a DC commutated machine.

This invention has a significant advantage over a conventional motor by utilization of a minimum amount of iron which undergoes flux reversal. That is, only the iron in the flux carrying elements in the armature is subject to the reversing flux as each pole is passed, and thus low hysteresis losses are experienced. In addition, the effects of flux leakage are reduced so that all of the armature windings experience the total flux change and thus are equally useful at producing torque.

This invention has significant heat transfer advantages through the use of "I" beam shaped stator bars, see FIG. 5. They make it possible to provide cooling to both the inner and outer surfaces of the inductor. For this reason, the superior high power to weight ratio is further enhanced.

By the principles of heat transfer, heat buildup in an inductor, with constant surfaces temperature and uniform internal heating per unit volume, depends on the square of its thickness. For example, compare an "I" beam armature 0.25 inches thick (as is possible in this invention) to a solid rotor, five inches in diameter (as is common in known devices). The heat buildup in such known devices is 400 times as great as experienced by this invention.

The electromotive device of this invention can be produced in several topological variations of the basic design. In addition to the rotating cylindrical shell configuration, by changing the orientation of the magnets and the windings, the motor can be made to produce a linear motion. Other variations (not shown) include pancake and conical configurations.

FIG. 12 illustrates a linear reciprocating implementation of the electromotive device of this invention in which the structure is flat. As shown, magnets 113 are mounted on flat lower return plate 114. Inductor 115 is provided with dispersed conductors 116 and flux carrying elements 117 in the same manner as described hereinabove with respect to the other embodiments illustrated except that the inductor is essentially flat rather than cylindrical. An upper return plate 118 is also provided, and inductor 115 is movable linearly with respect to, and between, lower and upper plates 114 and 118 by means of rollers 120 mounted on the edges of upper plate 118 and rollers 121 mounted in roller mounting boxes 111 (carried by lower plate 114).

While preferred embodiments of this invention have been illustrated and described, variations and modifications may be apparent to those skilled in the art. Therefore, I do not wish to be limited thereto and ask that the scope and breadth of this invention be determined from the claims which follow, rather than the above description.

What I claim is:

1. An electromotive device, comprising:
   an inductor including a plurality of magnetic flux conducting bars and electric windings disposed about said bars for generating an electromagnetic field;
   said electric windings comprising electrical conductors randomly dispersed between said flux conducting bars;
   said bars incorporating a geometry which shields said windings from the magnetic fields within the electromotive device;
   a magnetic field generator positioned adjacent to one side of said inductor;
   a first flux return path on the side of said magnetic field generator opposite said inductor; and
   a second flux return path on the side of said inductor opposite said magnetic field generator.

2. An electromotive device as defined in claim 1, wherein said flux conducting bars comprise a lamination of flux conducting sheets.

3. An electromotive device comprising:
   an inductor including a plurality of magnetic flux conducting bars comprising a lamination of flux conducting sheets and electric windings disposed about said bars for generating an electromagnetic field;
   said electric windings disposed about said bars for generating an electromagnetic field comprising electrical conductors randomly dispersed between said flux conducting bars;
   said bars incorporating a geometry which shields said windings from the magnetic fields within the electromotive device;
   said flux conducting sheets are fabricated from silicon iron and insulated from each other by a coating of silicon oxide;
   a magnetic field generator positioned adjacent to one side of said inductor;
   a first flux return path on the side of said magnetic field generator opposite said inductor; and
   a second flux return path on the side of said inductor opposite said magnetic field generator.

4. An electromotive device as defined in claim 2, wherein said flux conducting sheets are fabricated with a material grain direction parallel to the primary flux path through said flux conducting bars.

5. An electromotive device as defined in claim 1, comprising: means for reducing heat generation within said electromotive device, said means including said flux conducting bars fabricated with a material grain direction parallel to the primary flux path through said flux conducting bars.

6. An electromotive device as defined in claim 1, wherein said flux conducting bars are fabricated from a metal alloy having an iron content which creates a flux carrying ability approximately equal to the flux saturation point as determined by the electrical properties of the design of said electromotive device.

7. An electromotive device as defined in claim 1, wherein the dimension of said flux conducting bars along the axis parallel to the primary flux path through said flux conducting bars is short relative to the longitudinal axis of said bars which parallels the major axis of said electric windings disposed about said bars for generating an electromagnetic field.

8. An electromotive device as defined in claim 3, wherein said geometry includes extensions at the longitudinal edges for increasing the heat exchange surface of the inductor in addition to providing said magnetic shielding.

9. An electromotive device as defined in claim 1, wherein said magnetic field generator comprises permanent magnets.

10. An electromotive device as defined in claim 1, wherein said first flux return path is iron.

11. An electromotive device as defined in claim 1, wherein said second flux return path is fabricated from the same alloy as said bars.

12. An electromotive device as defined in claim 1, wherein said second flux return path is fabricated from the same material as said bars.

13. An electromotive device as defined in claim 1, wherein said inductor is a stator.

14. An electromotive device as defined in claim 1, wherein said inductor is an armature.

15. An electromotive device as defined in claim 1, wherein said electromotive device is a linear motor.

16. An electromotive device as defined in claim 1, wherein said electromotive device is a rotary motor.

17. An electromotive device as defined in claim 1, wherein said electromotive device is a generator.

18. An electromotive device as defined in claim 1, wherein said electromotive device is an alternator.

19. An electromotive device as defined in claim 1, wherein said geometry defines an "I".

20. An electromotive device as defined in claim 1, wherein said electric windings comprise large diameter conductors relative to the dimensions of said inductor.

21. An electromotive device as defined in claim 1, wherein said geometry includes extensions at the longitudinal edges for increasing the heat exchange surface of the inductor in addition to providing said magnetic shielding.

22. An electromotive device, comprising:
a stator including a plurality of magnetic flux conducting bars and windings comprising electrical conductors disposed about and randomly dispersed between said bars for generating an electromagnetic field;
said flux conducting bars incorporating a geometry which shields said windings from the magnetic fields within the electromotive device, said flux conducting bars comprising a lamination of flux conducting sheets insulated from each other by a coating of silicon oxide and fabricated with a material grain direction parallel to the primary flux path through said flux conducting bars from a silicon iron metal alloy having a flux carrying ability approaching the flux saturation point as determined by the electrical properties of the design of said electromotive device;
a plurality of permanent magnets positioned adjacent to one side of said stator;
a solid iron flux return path on the side of said magnetic field generator opposite said stator; and
a flux return path on the side of said inductor opposite said magnetic field generator, said flux return path comprising a lamination of flux conducting sheets insulated from each other by a coating of silicon oxide and fabricated with a material grain direction parallel to the primary flux path through said flux conducting bars from a silicon iron metal alloy having a flux carrying ability approximately equal to the flux saturation point as determined by the electrical properties of the design of said electromotive device.

23. An electromotive device, comprising:
a rotor including a plurality of magnetic flux conducting bars and windings comprising electrical conductors disposed about and randomly dispersed between said bars for generating an electromagnetic field;
said flux conducting bars incorporating a geometry which shields said windings from the magnetic fields within the electromotive device, said flux conducting bars comprising a lamination of flux conducting sheets insulated from each other by a coating of silicon oxide and fabricated with a material grain direction parallel to the primary flux path through said flux conducting bars from a silicon iron metal alloy having a flux carrying ability approaching the flux saturation point as determined by the electrical properties of the design of said electromotive device;
a plurality of permanent magnets positioned adjacent to one side of said rotor;
a solid iron flux return path on the side of said magnetic field generator opposite said rotor; and
a flux return path on the side of said inductor opposite said magnetic field generator, said flux return path comprising a lamination of flux conducting sheets insulated from each other by a coating of silicon oxide and fabricated with a material grain direction parallel to the primary flux path through said flux conducting bars from a silicon iron metal alloy having a flux carrying ability approximately equal to the flux saturation point as determined by the electrical properties of the design of said electromotive device.

24. An electromotive device as defined in claim 3, wherein said flux conducting sheets are fabricated with a material grain direction parallel to the primary flux path through said flux conducting bars.

25. An electromotive device as defined in claim 3, comprising:
means for reducing heat generation within said electromotive device, said means including said flux conducting bars fabricated with a material grain direction parallel to the primary flux path through said flux conducting bars.

26. An electromotive device as defined in claim 3, wherein said flux conducting bars are fabricated from a metal alloy having an iron content which creates a flux carrying ability approximately equal to the flux saturation point as determined by the electrical properties of the design of said electromotive device.

27. An electromotive device as defined in claim 3, wherein the dimension of said flux conducting bars along the axis parallel to the primary flux path through said flux conducting bars is short relative to the longitudinal axis of said bars which parallels the major axis of said electric windings disposed about said bars for generating an electromagnetic field.

28. An electromotive device as defined in claim 3, wherein said magnetic field generator comprises permanent magnets.

29. An electromotive device as defined in claim 3, wherein said first flux return path is iron.

30. An electromotive device as defined in claim 3, wherein said second flux return path is fabricated from the same alloy as said bars.

31. An electromotive device as defined in claim 3, wherein said second flux returning path is fabricated from the same material as said bars.

32. An electromotive device as defined in claim 3, wherein said inductor is a stator.

33. An electromotive device as defined in claim 3, wherein said inductor is an armature.

34. An electromotive device as defined in claim 3, wherein said electromotive device is a linear motor.

35. An electromotive device as defined in claim 3, wherein said electromotive device is a rotary motor.

36. An electromotive device as defined in claim 3, wherein said electromotive device is a generator.

37. An electromotive device as defined in claim 3, wherein said electromotive device is an alternator.

38. An electromotive device as defined in claim 3, wherein said geometry defines an "I".

39. An electromotive device as defined in claim 3, wherein said electric windings comprise large diameter conductors relative to the dimensions of said inductor.

* * * * *